United States Patent
Broberg

(10) Patent No.: US 6,364,566 B1
(45) Date of Patent: Apr. 2, 2002

(54) UNIVERSAL CONNECTOR FOR REMOTE CONTROL VEHICLES

(75) Inventor: James E. Broberg, Crystal Lake, IL (US)

(73) Assignee: Du-Bro Products, Inc., Wauconda, IL (US)

( * ) Notice: Subject to any disclaimer, the term of this patent is extended or adjusted under 35 U.S.C. 154(b) by 0 days.

(21) Appl. No.: 09/672,426

(22) Filed: Sep. 28, 2000

(51) Int. Cl.$^7$ ................................................ F16C 11/10
(52) U.S. Cl. ........................ 403/155; 403/157; 403/319
(58) Field of Search ................................ 403/154, 155, 403/150, 151, 152, 153, 161, 157, 324, 79, 319, 321

(56) References Cited

U.S. PATENT DOCUMENTS

| | | | | |
|---|---|---|---|---|
| 3,936,203 A | * | 2/1976 | Lowder et al. | 403/154 |
| 3,984,191 A | * | 10/1976 | Doty | 403/155 X |
| 4,735,534 A | * | 4/1988 | Oehlke | 403/155 X |
| 4,822,197 A | * | 4/1989 | DeMartino et al. | 403/154 |
| 4,951,550 A | * | 8/1990 | Ohki et al. | 406/155 X |
| 5,046,881 A | * | 9/1991 | Swager | 403/154 |
| 6,152,642 A | * | 11/2000 | Berthold et al. | 403/155 |

FOREIGN PATENT DOCUMENTS

DE  2811330  * 10/1978

* cited by examiner

*Primary Examiner*—Harry C. Kim
(74) *Attorney, Agent, or Firm*—Niro, Scavone, Haller & Niro

(57) ABSTRACT

A universal connector for use with a remote controlled apparatus comprising a base having an aperture sized to receive a control rod. Two fingers extend outwardly from the base, with a channel being located in one of the fingers. A slideable latch is retained in the channel, the latch having an aperture and a slit which separates opposingly located deformable prongs. The latch is operable between a locked and an unlocked position. Also provided are opposingly located first and second apertures located on the fingers. The apertures are aligned to receive a retaining pin. The first aperture is larger in diameter than the second aperture. The pin includes a head which engages one of the fingers and an internal stop which engages the other finger. A first portion of the pin is sized to fit within the first aperture and extends from the head to the internal stop. A second portion on the pin is sized to fit within the second aperture and extends from the internal stop to a terminal end. The terminal end has an annular groove that sized to releasably receive the prongs which seat within the groove on the pin.

3 Claims, 2 Drawing Sheets

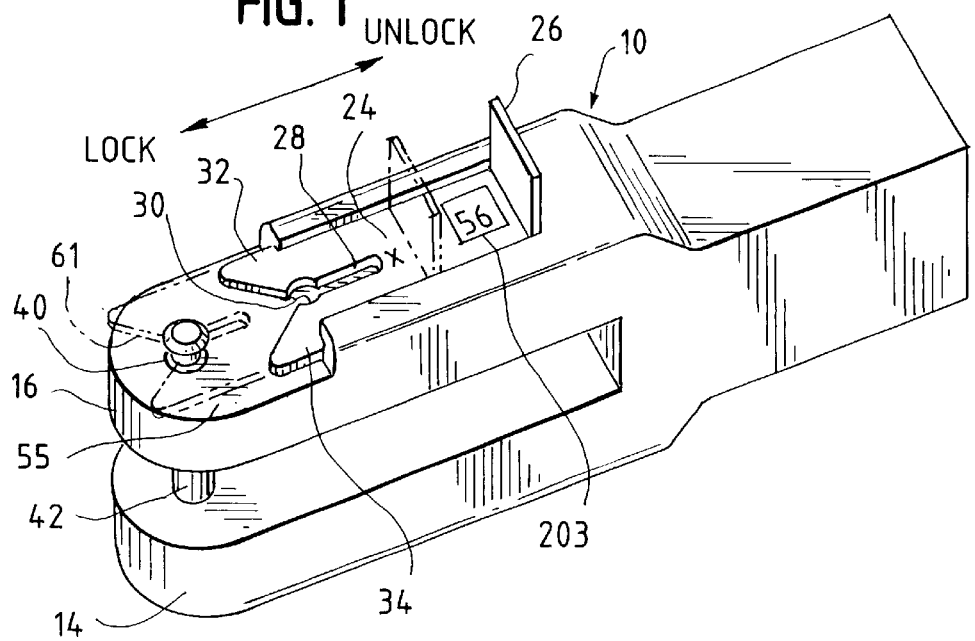
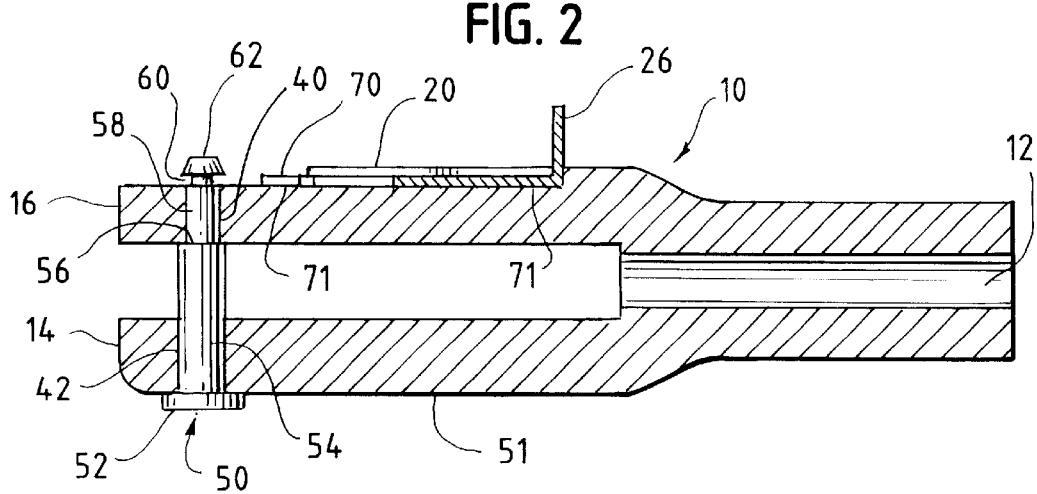
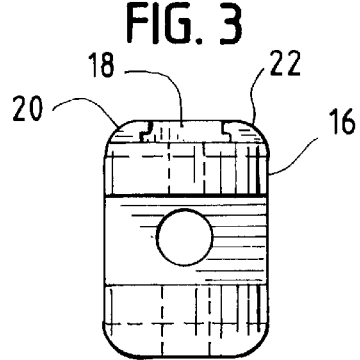

UNIVERSAL CONNECTOR FOR REMOTE CONTROL VEHICLES

BACKGROUND OF THE INVENTION

The present invention relates to a universal connector that is used to link various components of a remote controlled or hobby aircraft together. More specifically, the present invention concerns a U-shaped connector that includes a self-contained latch which coacts with a pin.

SUMMARY OF THE INVENTION

In remote control aircraft, a number of moving parts need to be linked together in order to operate the device. To do this, connectors are often used which link moving parts such as a servo arm to the control horn of a flap.

However, by design, the parts of a remote control aircraft are often reduced in size, and as a result, the components are often difficult to manually manipulate and are difficult to keep from losing. This is especially true with respect to retaining pins and locking clips.

The present invention is designed to provide a more user friendly connector in which the latch or locking clip forms part of the connector. This makes the device easier to use and reduces incidence of losing the small sized clips during use.

DESCRIPTION OF THE DRAWINGS

These and other features, objects and advantages of the present invention will become apparent from the following description and drawings wherein like reference numerals represent like elements in several views, and in which:

FIG. 1 is a perspective view of one embodiment of the invention showing the latch in a locked and unlocked position;

FIG. 2 is a cross-sectional view of the embodiment shown in FIG. 1;

FIG. 3 is a front view of the embodiment shown in FIG. 2;

DESCRIPTION OF THE PREFERRED EMBODIMENT

Set forth below is a description of what are currently believed to be the preferred embodiments or best examples of the invention claimed. Future and present alternatives and modifications to the preferred embodiments are contemplated. Any alternates or modifications in which insubstantial changes in function, in purpose, in structure or in result are intended to be covered by the claims of this patent.

As shown in FIGS. 1 and 2, the present invention includes a base 10, which includes an aperture 12 which is sized to receive a control rod (not shown). Typically, the control rod is self-tapping, and thus, locks into position within aperture 12.

Figure 4:
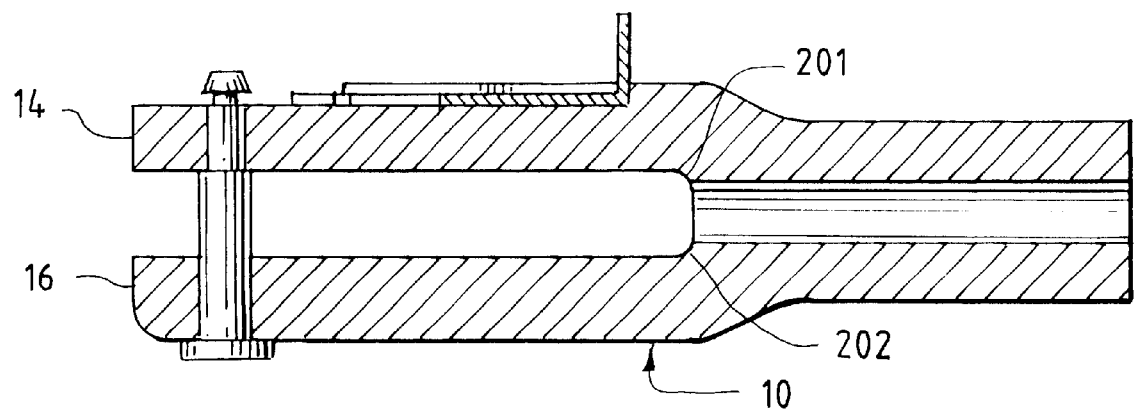
FIG. 4 is a cross-sectional view of an alternate embodiment of the present invention.
Figure 5:
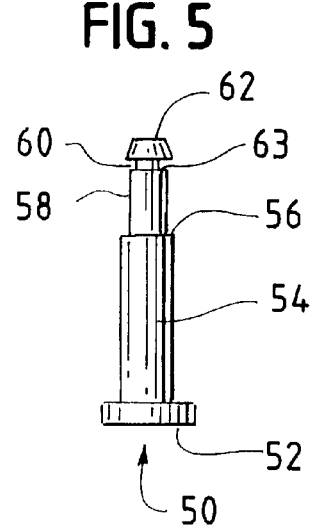
FIG. 5 is a cross-sectional view of a pin used with the invention.

Extending outwardly from base 10 are fingers 14 and 16. As shown in FIG. 3, channel 18 is formed in finger 16 by L-shaped walls 20 and 22. Of course, channel 18 may be located on finger 14 as well. Since base 10 may be made of plastic, its components may be simply created as a single molded unit. However, as shown in FIG. 4, angled or radius portions 201 and 202 may be added to the juncture where the fingers joint the base. Increasing the material or mass used in this location reduces unwanted breakage during the use of the fingers.

Located within channel 18 is a latch 24 having a handle 26. Latch 24 also includes a slit 28 and aperture 30 which separates opposingly located prongs 32 and 34. As shown in FIG. 1, latch 24 is also operable between a locked and unlocked position. Latch 24 may also include on it imprinted identification 203 which identifies the size of the control rod which would fit within aperture 30.

Located on fingers 14 and 16 are apertures 40 and 42. The apertures are aligned so that pin 50 may be inserted into the apertures. As is also shown in FIG. 2, the diameter of the aperture located on finger 14 is larger than the aperture located on finger 16.

As shown in FIG. 2, pin 50 includes a head 52, a first portion 54 which is sized to fit within aperture 42. Also included is an internal stop 56 and second portion 58 which is sized to fit within aperture 40. Pin 50 also has a terminal end 62 which includes an annular groove 60.

In use, the aircraft piece to be connected is inserted between fingers 14 and 16 so that pin 50 may be inserted through an aperture in the aircraft component. To do this pin 50 is inserted into apertures 40 and 42. As shown in FIG. 2, head 52 engages wall 51 of finger 14 and acts as a stop when pin 50 is fully inserted.

Internal stop 56 is also positioned to engage inner surface or wall 53 of finger 16. This engagement assists in properly aligning groove 60 by causing lower edge 63 of groove 60 to be flush with wall 55 of finger 16.

Once groove 60 is properly positioned, latch 24 may be slidingly moved from an unlocked position into a locked position. When operated to secure pin 50, the first portion to engage pin 50 is V-shaped notch 61. As latch 24 is pressed against pin 50, the engagement forces prongs 32 and 34 to spread apart so that pin 50 may be received by aperture 30. Slit 28 permits this spreading or deformation to occur. Once aperture 30 is positioned around groove 60 of pin 50, prongs 32 and 34 snap inwardly resulting in the upper and lower surfaces 70 and 71, respectively, to seat within groove 60. This engagement prevents pin 50 from disengaging latch 24 which locks the pin into position. To unlock this pin, the opposite steps are used.

Latch 24 is also frictionally fitted within channel 18 and slidingly engaged by walls 20 and 22. This arrangement permits latch 24 to articulate within channel 18 while still being secured to base 10. This makes the latch easier to use and reduces the incidence of losing a free-standing clip or latch.

Also making the device easier to use are the two different sized apertures in the fingers and two stops, 52 and 56, on the pin. This arrangement acts to consistently place the groove in a proper alignment so as to receive latch 24. Again, when dealing with small parts, this ability to achieve proper alignment makes the device easier to operate. Thus, not only may the present invention be beneficially used with remote-controlled aircraft, the invention is also useful with other hobby type vehicles such as cars, boats, sailboats, and helicopters as well.

While the preferred embodiments of the present invention have been illustrated and described, it will be understood by those of ordinary skill in the art that changes and other modifications can be made without departing from the invention in its broader aspects. Various features of the present invention are set forth in the following claims.

What is claimed is:

1. A universal connector for use with a remote controlled apparatus comprising:

a base having an aperture sized to receive a control rod;

two fingers extending outwardly from said base;

a channel located in one of said fingers;

a slideable latch retained in said channel, said latch having an aperture and a slit which separates opposingly located deformable prongs;

said latch operable between a locked and an unlocked position;

opposingly located first and second apertures located on said fingers, said apertures aligned to receive a retaining pin;

said first aperture larger in diameter than said second aperture;

said pin including a head which engages one of said fingers and an internal stop which engages the other of said fingers;

a first portion of said pin sized to fit within said first aperture and extending from said head to said internal stop;

a second portion on said pin sized to fit within said second aperture and extending from said internal stop to a terminal end; and said terminal end having an annular groove sized to releasably receive said prongs which seat within said groove on said pin.

2. The device of claim 1 wherein said latch includes thereon an identification of the pin size which may be used with said latch.

3. The device of claim 1 wherein increased mass is added to the junction where the fingers extend outwardly from said base.

* * * * *